(12) United States Patent
Balint

(10) Patent No.: US 12,188,514 B2
(45) Date of Patent: Jan. 7, 2025

(54) HAND HELD ELECTRONIC DEVICE WITH AN AIR MOUSE

(71) Applicant: Geza Balint, Dunavarsany (HU)

(72) Inventor: Geza Balint, Dunavarsany (HU)

( * ) Notice: Subject to any disclaimer, the term of this patent is extended or adjusted under 35 U.S.C. 154(b) by 1270 days.

(21) Appl. No.: 15/774,160

(22) PCT Filed: Nov. 5, 2015

(86) PCT No.: PCT/HU2015/050016
§ 371 (c)(1),
(2) Date: May 7, 2018

(87) PCT Pub. No.: WO2017/077351
PCT Pub. Date: May 11, 2017

(65) Prior Publication Data
US 2018/0313377 A1  Nov. 1, 2018

(51) Int. Cl.
*G06F 3/0346* (2013.01)
*A63H 33/08* (2006.01)
(Continued)

(52) U.S. Cl.
CPC ........... *F16B 5/0004* (2013.01); *A63H 33/08* (2013.01); *A63H 33/084* (2013.01); *F16B 2/00* (2013.01);
(Continued)

(58) Field of Classification Search
CPC ........ A63H 33/04; A63H 33/06; A63H 33/08; A63H 33/084; A63H 33/086; F16B 2/00;
(Continued)

(56) References Cited

U.S. PATENT DOCUMENTS

| 4,874,341 A | * | 10/1989 | Ziegler | A63H 33/08 446/109 |
| 6,453,973 B1 | * | 9/2002 | Russo | A47B 47/0075 160/135 |

(Continued)

FOREIGN PATENT DOCUMENTS

| GB | 2252056 | * | 7/1992 | A63H 33/08 |
| WO | WO 99/39795 | * | 8/1999 | A63H 33/08 |

*Primary Examiner* — Dennis P Joseph
(74) *Attorney, Agent, or Firm* — Handal & Morofsky LLC; Anthony H. Handal

(57) ABSTRACT

A hand held electronic device (10) including an air mouse unit for communicating with a remote host device (30) having a display screen (32) on which a cursor is displayed, wherein during operation as an air mouse the movement of the device controls the movement of the cursor, the device comprises an elongated body (11) with different surface regions accessible by a finger of the holding hand, and in one accessible surface region has a control field (35, 36), and a touch sensor (23, 24) is arranged under the control field (35, 36) that senses when the control field (35, 36) is touched by the finger and when the finger is moved thereon, and the air mouse unit has a deflection control unit (27) controlling the speed of the cursor movement in response to a unity movement of the device, and a processor (43) is connected to the touch sensor (23, 24) that controls the deflection control unit (27) to increase or decrease the speed of the cursor control in response to a predetermined first finger movement. The device can be complemented with a direct data entry function using a different surface region and with a conventional mouse function using a further different region.

19 Claims, 4 Drawing Sheets

(51) Int. Cl.
*F16B 2/00* (2006.01)
*F16B 5/00* (2006.01)
*G06F 3/033* (2013.01)
*A63F 9/12* (2006.01)

(52) U.S. Cl.
CPC ...... *G06F 3/033* (2013.01); *A63F 2009/1244* (2013.01)

(58) Field of Classification Search
CPC ...... F16B 5/0004; G06F 3/033; G06F 3/0346; G06F 3/03541; G06F 3/03543; G06F 3/03547
USPC .......... 446/85, 115, 116, 124, 125, 127, 128
See application file for complete search history.

(56) References Cited

U.S. PATENT DOCUMENTS

| | | | |
|---|---|---|---|
| 7,696,980 B1* | 4/2010 | Piot | G06F 3/04847 345/157 |
| 2005/0287906 A1* | 12/2005 | He | A63H 33/086 446/109 |
| 2011/0050566 A1* | 3/2011 | Sawai | G06F 3/017 345/157 |
| 2014/0145955 A1* | 5/2014 | Gomez | G06F 3/04886 345/163 |
| 2015/0029109 A1* | 1/2015 | Chou | G06F 3/047 345/173 |

* cited by examiner

HAND HELD ELECTRONIC DEVICE WITH AN AIR MOUSE

The invention relates to hand held electronic device with an air mouse that performs the function of a conventional mouse without the need of placing it on a stationary flat surface, wherein the air mouse is in wireless communication with a host device that has or is connected to a display screen on which the mouse operations have to be carried out.

Several air mouse types are known and some of them are in widespread use. A common feature of all of them is that the cursor on the controlled screen follows the horizontal (yaw) or vertical (pitch) component of the movement of the device.

The publication US 2014/0145955 A1 describes in detail the background art and the structural and functional design of state of the art air mouse solutions, and it has suggested the combination of the air mouse function with a hand held device that has a large touch screen that can be divided into a plurality of regions. This publication is incorporated by reference.

A basic aspect of the air mouse suggested therein is to provide additional functions for the user in addition to or in spite of moving the cursor in the air for controlling the position of the cursor. The touch screen is divided into minimum two fields, and the device can also be used to control the application software running on the host device and/or to enter characters or commands. In one of the modes a designated area on the touch screen can be used as a touch pad and when this function is selected, the mouse function changes from a 3D mode into a 2D mode, where the cursor is controlled by a finger touching the screen and moving thereon. The device can also be used for data entry either by using a displayed keyboard or by gestures made on the touch screen.

The wide acceptance of different types of mouse lies primarily in that they do not require visual attention, but the user moves the mouse on a stable flat surface while watching a screen of a computer or host device, and his attention need not be divided between the screen and the touch screen of the device if the mouse is provided with such a touch screen. In air mouse applications no stable flat surface is available and the cursor follows the movement (components of the movements) of the hand that holds the device. The dividing of the user's attention between the screen of a computer or host device controlled by the air mouse and a touch screen of the mouse is particularly unpleasant or slows down handling.

A significant drawback of the device in the cited publication lies in that its functions cannot be utilized without at least intermittent inspection of the information displayed on the touch screen. This is a special additional requirement, because the use of a commonly used 2D mouse or a 3D air mouse does not require visual attention to the mouse at all, it is sufficient if the user watches the displayed screen on the host device. The need of at least partial visual attention to the device divides the attention of the user from the display of the host device.

A further, perhaps more acute problem of using an air mouse lies in that an efficient cursor control requires both high speed cursor movements from one corner of the screen to a different, often remote area, and when the cursor approaches the target region where it has a selection function, much finer movements are required. When a hand is not supported by a stable surface, and the mouse is also floating in the hand, these two requirements often act against each other. If the cursor is controlled so that normal hand movements result in fast cursor movements on the screen, this is convenient if different (often remote) regions on the screen have to be reached soon. In the vicinity of the target zone, however, much slower hand movements are needed to select the target zone, and fine hand movements are difficult to be made when the hand is unsupported, and it always has a kind of trembling. If the cursor control is designed so that the fine cursor movements can be handled in a convenient way, then the re-positioning of the cursor to a remote region requires rather large hand movements, which is also inconvenient.

Especially with state of the art large screens the required cursor movements might equally demand fast cursor control to position the cursor from one edge part of the screen to a remote field, while when the cursor is close to its target, slower handling is required to reach the selected part. If we consider this problem from the point of view of comfortable manipulation, which is limited to a fairly small range of hand displacements, the cursor control can be comfortable if the same hand movement causes faster cursor movements, while in the vicinity of the target area the same degree of hand movement should cause much smaller and finer cursor reaction.

A still further problem lies in that mouse functions and data entry functions are different and impose different requirements on the design of the mouse and the data entry device. As described earlier, a mouse becomes a comfortable cursor control tool, if it does not require visual attention. Data entry can be combined with cursor movements if the user has to hit certain displayed fields on the screen and select the character or function by clicking with the mouse when the cursor is at the required field. Such a data entry is rather slow and uncomfortable. Direct data entry devices, like keyboards are much more comfortable to use as long as the keyboard has a size matching that of the human hand and fingers. With the development of miniaturization the size of keyboards has become smaller and this is inversely proportional with the ease of handling. Therefore there is a need to a data entry design that does not require visual attention at all so that the user can focus his attention to watching the screen.

The cited publication has tried to combine these contradicting properties, but has failed to solve the contradiction between the need of fast and slow cursor movements, and when it is used as a data entry device, its small screen requires visual attention that divides the attention of the user. In data entry mode it also has the same problem of providing tiny displayed keyboards in which the required character is difficult to find, especially if the device is held in hand and not supported by a stable surface.

In case a hand held device is required that performs not only the function of an air mouse but it is also a requirement to carry out data entry functions other than making selection by the mouse, then the main design principle should be the aforementioned comfortable and ergonomic use and all other design requirements should be subordinated to this main principle, and to this end a data entry function should be created that does not require visual attention at all.

There is a further need that should be satisfied, namely the number of useful devices of a computer or entertainment system should be reduced as much as possible. Neither the functioning of an air mouse nor a new data entry system can render the use of a conventional optical mouse unnecessary. It is therefore a realistic need to unite the number of devices as much as possible and to find a comfortable design that allows the combination without compromising the comfort of any of the required functions.

The basic task of the present invention is to provide an improved air mouse that can be used with moving the hand in a comfortable range which can be associated both for fast cursor control and in accordance with the need of the user it can associate a fine cursor movement with the same or comparable degree of hand movements. This means that the user can manipulate with his hand in the range where he finds it most comfortable and less tiring. Of course such a cursor control will need not require the watching of the air mouse and to divide the user's attention between the screen, on which the cursor moves and the device held in his hand.

A further task lies in that the user can change between air mouse and touch-pad modes and if he prefers can control the cursor movement by moving his thumb or forefinger along a touch pad region of the device, again without paying visual attention thereto.

A mouse function is perfect if the user can click whenever he decides to do so and can define whether he clicks with the virtual left or right button, or if a scroller is available also to scroll and click by pressing the scroll area.

According to a further aspect of the invention the task lies in to combine the air mouse function, preferably the aforesaid air mouse functions and additionally to enable its use as a direct data entry device (i.e. where data are entered directly and not by a selection depending on the position of the cursor) so that the date entry does not require any visual attention.

A still further object lies in the creation an ergonomic design that fits well in the hand of the user and allows optimum manipulation by his finger or fingers that is not tiring even after a longer use.

According to the basic task and to the first aspect of the present invention a hand held electronic device has been provided that includes an air mouse unit for communicating with a remote host device that has a display screen on which a cursor is displayed, wherein during operation as an air mouse the component of the movement of the device in horizontal (yaw) and in vertical (pitch) direction controls the movement of the cursor in an associated direction, and the device comprises an elongated body with a first face fitting in the hand that holds the device and a second opposite face which has at least a region easily accessible by a free finger of the holding hand for being touched, the second face has a control field in the accessible region, and a touch sensor is arranged under the control field that senses when the control field has been touched by the finger and when the finger is moved thereon, and according to the invention the air mouse unit has a deflection control unit that controls the speed of the cursor movement in response to a unity movement of the device, and a processor is connected to the touch sensor that controls the deflection control unit to increase or decrease the speed of the cursor control in response to a predetermined first finger movement.

It is preferable if the cursor movement is allowed or prohibited to function depending on whether the control field is touched or left untouched. In this way when the user does not wish to move the cursor but moves his hand (e.g. explains something), he will not touch the control field and the cursor retains its position even if he moves his hands.

To provide a definite change of function it is preferred if this touch requires a predetermined pressure for switching the air mouse functional mode and/or the cursor speed control.

A further preferred functions lies in if the processor is programmed to detect when a predetermined second finger movement (preferably normal to the first movement) is sensed, and in response to this detected second movement the air mouse function is terminated or disabled and the control of the cursor movement is taken over by the movement of the finger on said control field as if was a touch pad. Such a design allows the user to use a finer cursor control if he decides to do so.

In a further embodiment the body comprises a displacement sensor generating a signal when the control field is pressed anywhere and the body is slightly bent thereby, and the control field is virtually divided into a left field and a right field, and the signal generated by the displacement sensor is associated with said the left or right fields, respectively to have the processor generate a left mouse click signal or a right mouse click signal towards the remote host device depending on whether the left or right field has been pressed. In this way the left and right mouse buttons have been functionally reproduced, but the device is less sensitive where the clicking has been made.

In a further preferable embodiment the control field has a separated narrow scroll field portion extending substantially along the longitudinal direction of the body and it is connected to the processor, and the touching and movement of this scroll field portion by a finger triggers the processor to generate a scroll signal towards the remote host device interpreted as scrolling the cursor up or down depending on the sense of finger movement on the scroll field.

To provide a further click function the processor is programmed to sense when the scroll field has been pressed and to generate then a central mouse click signal forwarded to the remote host device.

It is also preferred if the scroll field is designed as a recess on the second face to enable sensing when a finger is placed thereon.

For a better haptic feedback the recess has a slowly varying width along the length, and the upper surface of the recess is roughened.

According to the second aspect of the present invention a hand held electronic device has been provided that includes an air mouse unit for communicating with a remote host device that has a display screen on which a cursor is displayed, wherein during operation in an air mouse mode the component of the movement of the device in horizontal (yaw) and in vertical (pitch) direction controls the movement of the cursor in an associated direction, and the device comprises a body with a first face fitting in the hand that holds the device and a second opposite face, at least one of said faces has a front region which when that face is the upper face is easily accessible by a free finger of the holding hand for being touched, and according to the invention the device comprises a position sensor determining whether the device is held with its first or second face fitting in the palm of the holding hand, or whether the device has been turned by 180° around an imaginary vertical axis, and comprises a data entry device with a data entry region provided on a face on the body, and when the body is turned so that the data entry region is the easily accessible on by the free finger, the air mouse mode is disabled and the data entry device is enabled to switch over said device into a data entry mode in which respective data are entered in the host device, and the data to be entered are associated with respective combinations of elementary finger movements along the data entry region.

It is preferred if the data entry region is a sunken area lying deeper than the first surface and has a closed boundary, and a plurality of discrete isles are provided that extend out slightly from the sunken surface; and the isles are arranged so that respective channels are formed between them and between their outer edges and the closed boundary, wherein the channels between the isles having their ends at respective special parts of the boundary, the channels are designed so that the moving finger can sense them and feel said special parts by haptic feedback only, and when the finger is moved along the channels of the data entry region the user can sense by haptic feedback at what particular position the finger momentarily touches.

It is preferred if respective recesses are being formed at the special parts of the boundary line to provide a more definite haptic feedback when the finger has arrived at one of the special parts.

To provide further selectable data entry functions the body comprises a displacement sensor sensing when a finger presses any of the faces towards the other one, and a touch sensor is arranged under the first face, and depending on the position of the pressing finger different signals are generated and forwarded to the remote host device interpreted thereby as different function commands. For a more definite haptic feedback the body comprises a vibrator vibrating slightly the body when the finger touches one of the special parts of the boundary line.

For providing an ergonomic design which can be used without being tiring the body has an elongated, substantially flat rounded shape that fits in the holding hand and comprises smoothly adjoining three parts, a curved rear body part, a first extended front part and a second extended front part both having slightly rounded flat surfaces, the front parts extend out in forward direction from the rear body part and a gap is defined between the first and second front parts closed by a rounded front side of the rear body part, and the data entry region is located on the surface of the second front part.

It is preferred if the displacement sensor is arranged in one of the first or second front parts, because these parts can bend in an easier way, therefore the required pressing force is small.

For the sake of ease of use it is preferred if the second front part associated with the data entry mode is slightly longer than the first front part associated with the air mouse mode.

The two main aspects of the present invention can best be used when they are used together, i.e. both objectives are attained with the same hand held device so that in the air mouse mode the device is turned so that the associated touch sensor becomes the easily accessible region by the finger.

According to a further aspect of the invention a hand held electronic device has been provided for communicating with a remote host device that has a display screen on which a cursor is displayed, and the device controls the movement of the cursor and comprises an elongated body with a first face fitting in the hand that holds the device and a second opposite face which has at least a region easily accessible by a free finger of the holding hand for being touched, and according to this aspect of the invention the device comprises at least one of an air mouse unit that controls the cursor movement in an air mouse functional mode and a data entry device that enters data in the remote host device in a data entry functional mode, a first touch sensor is arranged at a first part of the faces of the body that when contacted by a free finger of a user at least partially controls the cursor movement, and the data entry device comprises a second touch sensor arranged under a data entry region which is located at a different second part of one of the faces, and the device can be turned in the hand so that the second touch sensor becomes easily accessible by the free finger; and the device comprises additionally in the body a conventional optical mouse circuit and a window at a third part of one of the faces different from the first and second parts, and the face of the body which holds the window has a shape that can be placed and smoothly moved on a plane support surface when used in optical mouse functional mode.

In a preferred embodiment the body has a substantially flat rounded shape that fits in the holding hand and comprises smoothly adjoining three parts, a curved rear body part, a first extended front part and a second extended front part both having slightly rounded flat surfaces, the front parts extend out in forward direction from the rear body part and a gap is defined between the first and second front parts closed by a rounded front side of the rear body part, and the first and second surface parts are arranged on a front and rear portion of the same first face of the body, and the window is arranged at the opposite second face of the body, and comprises a support plate pivotally attached to the rear body part and can be turned to an open position in which the support plate cooperates with a remote front part of the first face to provide a definite support for the smooth movement.

The open position can be fixed so that the rear body part comprises a lock that fixes the support plate in open position.

In the suggested ways the device can be used as an air mouse, more specially as an air mouse where a speed control is provided, as a data entry device that does not require visual attention, and finally as a conventional optical mouse. It is only the intention of the user to chose the required mode that choice can be made automatically by the appropriate positioning of the device in the hand of the user.

The invention will now be described in connection with preferable embodiments, in which reference will be made to the accompanying drawings. In the drawing.

Figure 1:
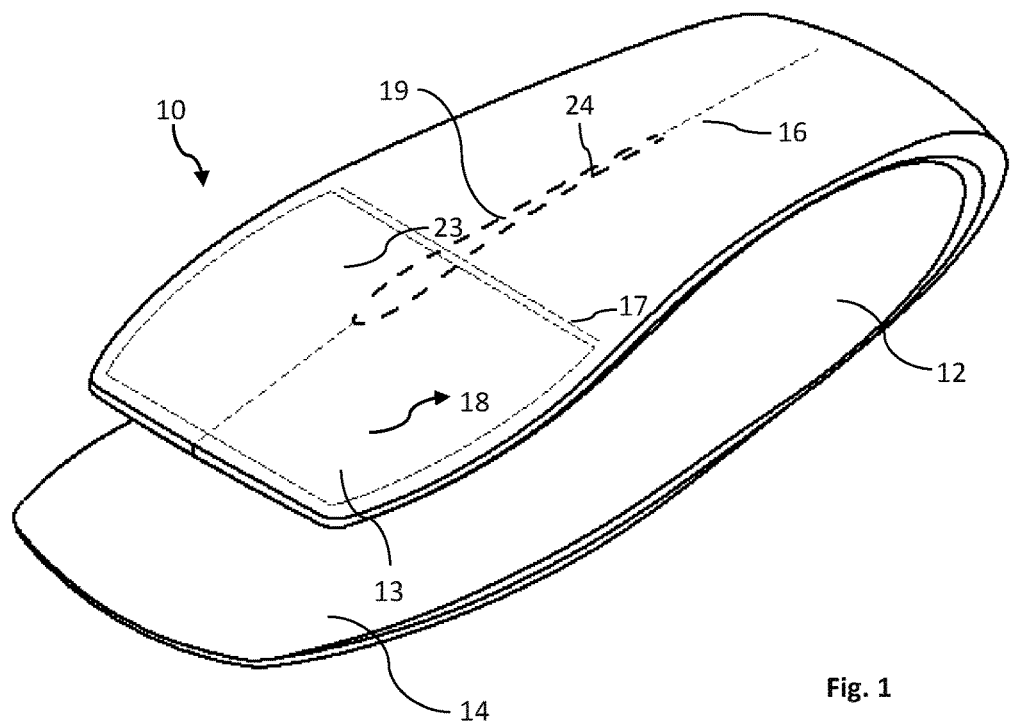
FIG. 1 shows the perspective view of a first embodiment of the hand held device.
Figure 2:
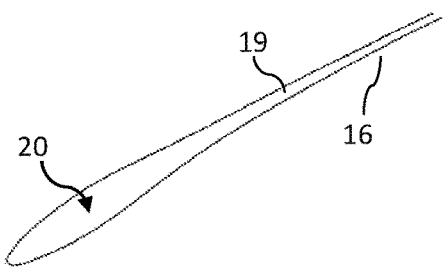
FIG. 2 shows an enlarged sketch of the recess.
Figure 3:
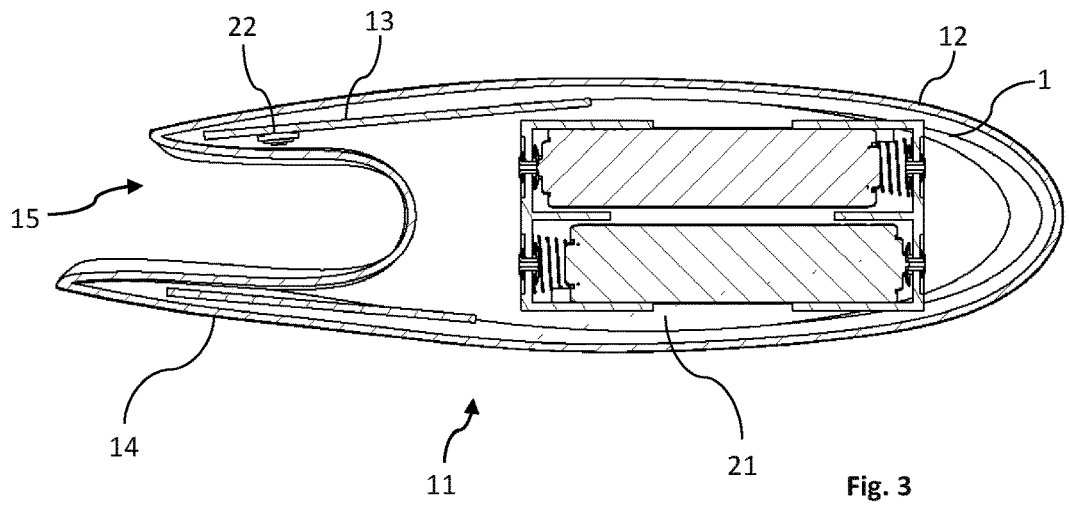
FIG. 3 shows the side view of the device, partly in section.

Referring now to FIGS. 1 to 3, a smart air mouse has been shown in the form of a hand held device 10, which has a specific shape as shown that has an elongated, substantially flat rounded body 11 that fits in the hand of a user and has smoothly adjoining three parts, a curved rear body part 12, a first extended front part 13 and a second extended front part 14 that both have slightly rounded flat surfaces. The front parts 13 and 14 extend out in forward direction from the rear body part 12 and their respective upper/lower surfaces fit smoothly to the outer surface of the rear body part 12. A gap 15 is defined between the first and second extended parts 13, 14 closed by a rounded front side of the rear body part 12. In FIG. 1 the first front part 13 constitutes the upper part of the device, but if it is turned upside down the role of upper/lower parts 13, 14 will get interchanged, therefore both of the first and second parts 13, 14 can equally be the upper or lower part. The term "rear" indicates that the rear body part 12 fits well in the palm of the user, and at least one finger of the user can conveniently manipulate on the slightly rounded upper surface of the first or second body parts 13 or 14 whichever faces upwards. The term "finger"

designates also the thumb of the user. In the embodiment shown in FIGS. 1 to 3 the first and second body parts 13, 14 have different lengths, and the second body part 14 is slightly longer than the first body part 13. It can be seen in the drawing that the width of the first and second body parts 13, 14 slightly increases along a curved line away from the rear body part 12 then after reaching a maximum it gets narrower.

FIG. 1 shows the central longitudinal axis 16 of the upper part 13 and a curved transverse border line 17. The transverse border line 17 designates the rear limit of a manipulation area 18 within which the forefinger or the thumb of the user can comfortably rest or move and reach any portion. In a preferred embodiment along a part of the central axis 16 a recess 19 is provided, and in the enlarged sketch of FIG. 2 it can be seen that the recess 19 has a field 20 continuously widening in front direction. The field 20 can be used to perform a scroll function. It can be preferred if not only the width but also the depth of the recess 19 increases towards the front end of the field 20. Such a design of the recess 19 provides a kind of haptic feedback for the user when he touches the recess and moves his finger along the recess 19, whereby he can sense roughly the position of his finger. It is also preferred if the bottom of the recess 19 has a coarse, roughened surface, so that the finger touching the recess can feel when it is moved along the recess 19.

The side view of FIG. 3 shows the curved design of the device 10 how the first and second front parts 13, 14 fit to the rear body part 12. In the interior space of the rear body part 12 of the device 10 batteries 21 are provided to ensure the required energy for the electronic circuits arranged in the rear body part 12 but these circuits are small in size and have not been illustrated separately.

In the inner part of the first front part 13 close to the gap 16 a small sensor 22 is arranged that can be a micro switch or any other displacement sensor, which has the task of sensing when the two front parts 13 and 14 are compressed. The material of the body 11 and especially of the parts 13 and 14 has a certain kind of flexibility, and when the manipulation area 18 is pressed at any position relative to the other part supported by the palm of the user, this is followed by a slight inclination of the two compressed parts, and this displacement is sensed by the sensor 22. The turning on of the sensor 22 corresponds to a clicking with a mouse, but this clicking is not position- or field-dependent as in case of most mouse designs, where clicking should be made when the finger presses a special button. The differentiation whether a clicking takes the role of a left, central or right button is controlled electronically as it will be described at a later part of the specification.

In the embodiment shown in FIGS. 1 to 3 the first front part 13 is associated with the air mouse function of the device, and respective touch sensors 23, 24 are placed under the manipulation area 18 and the recess 19 to sense the position of the finger when it is placed or moved anywhere thereon. A larger single touch sensor can take the role of both sensors 23, 24 and the differentiation serves only the ease of understanding. The touch sensors 23, 24 are placed and visually hidden under the thin plastic cover sheet of the device 10 therefore they have been illustrated by dashed lines.

Figure 4:
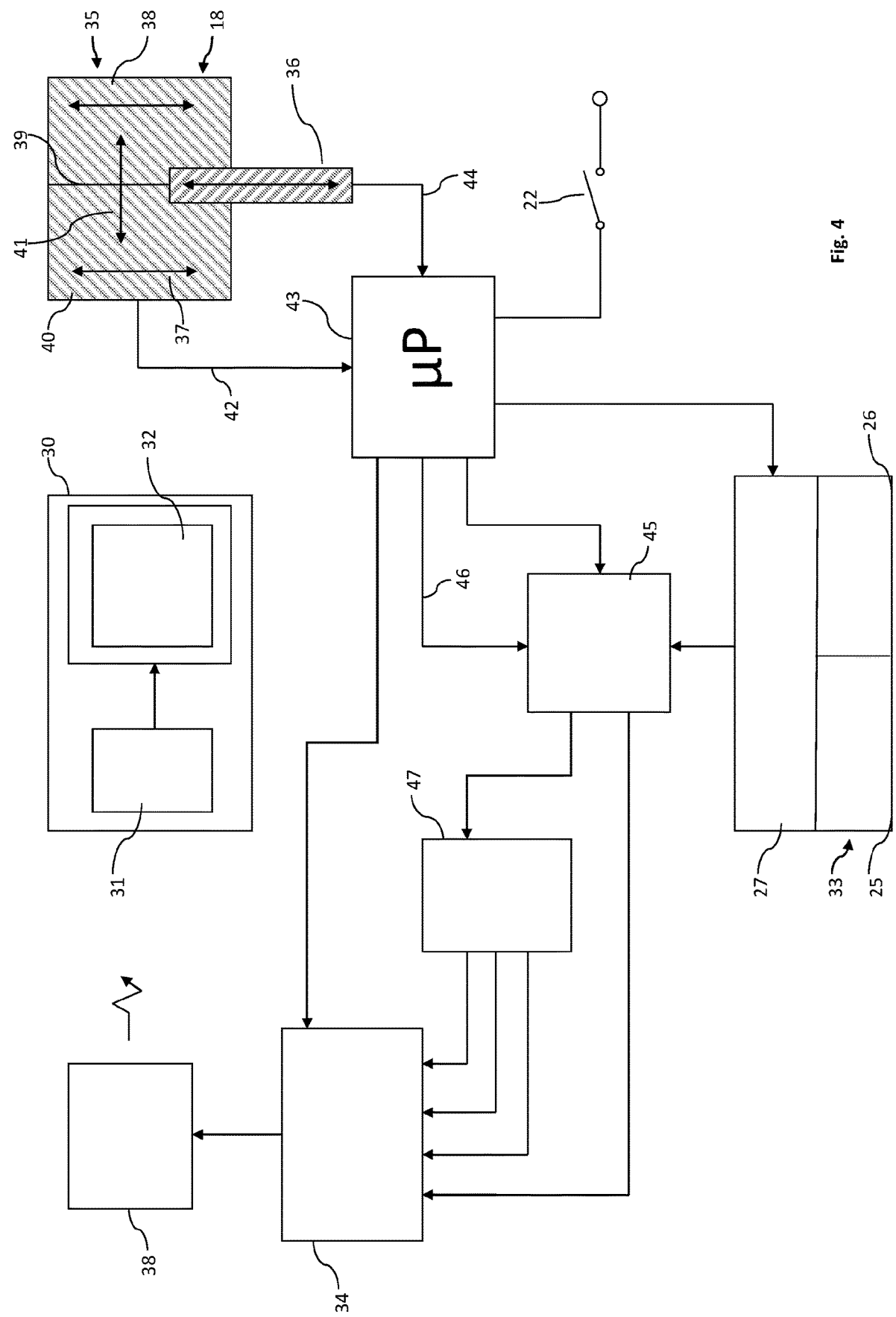
FIG. 4 shows the schematic functional block diagram of an air mouse embodiment.

FIG. 4 shows a schematic functional block diagram of the hand held device 10 when performing the function of an air mouse. The device 10 is in a wireless communication connection with a remote host device 30 that has a wireless receiver 31 and a main unit with a display screen 32 that the user watches when uses the device 10 as an air mouse. The host device 30 can be any smart unit that can receive cursor control through the receiver 31. As examples the host device 30 can be a set top box or a smart television set or a computer with internet access or a projector, etc.

The device 10 has an air mouse functional unit of conventional design that includes a motion sensor 33, in which a gyroscope 25 and acceleration sensor 26 are arranged. The motion sensor 33 has a virtual deflection control unit 27. The task of the motion sensor 33 is to generate cursor control signals that follow the yaw and pitch components of the movement of the device 10. A driver 34 receives cursor control signals either from the motion sensor 33 or from a processor 43 through a control unit 45 and the driver 34 is connected to wireless transmitter 38 that is communicating with the receiver 31 of the host device 30.

The essence of this embodiment of the invention lies in how the user controls the movement of the cursor on the display screen 32 by his hand that holds the device and places and/or moves his free finger on the manipulation area 18 under which the touch sensors 23, 24 are located. In FIG. 4 the manipulating area has been shown with hatched lines, and this includes main control field 35 and scroll field 36 (which correspond to the recessed field 20 shown in FIG. 2). The main control field 35 is virtually divided into a left field 37 and a right field 38 divided preferably by the central longitudinal axis of the first front part 13. This separation can be a virtual separation only, wherein distinction between the fields 37, 38 is made only by software that evaluates the position signals received from the touch sensor 23 and the user will not physically sense where the separation line extends. It is preferred if a small rib or recess 39 is formed along the central longitudinal axis 16 of the main control field 35, whereby when the finger moves along the main control field 35 the user can feel where the rib 39 extends and he will know whether his finger is on the left or right field 37, or 38.

The touch sensor 23 under the manipulation field 18 can sense and differentiate between the following events:
 a. Whether a finger is in contact with the main control field 35;
 b. Whether the finger contacts the left or the right field 37 or 38;
 c. Whether the finger moves substantially parallel to the longitudinal axis along arrow 40;
 d. Whether the finger moves so that the movement has a transverse component parallel to the transverse axis shown by arrow 41;
 e. Whether the finger is at the scroll field 36 and where it contacts the field 36;
 f. It can also sense the direction, position and speed of the finger movements.

The signals sensed by the touch sensor under the main control field 35 are led through line 42 to the processor 43 which is preferably a programmable microprocessor, and the signals under the scroll field 36 are also coupled to the processor 43 through line 44.

The processor is programmed so that it senses all of the listed events. Concerning these events the term "contact" includes both the slightest touch that can be sensed by the touch sensors and also a contact made with a predetermined threshold pressure force that can be distinguished from an accidental touch. The threshold contact pressure might have a significance in providing safety of operation, or might express an intention that certain events will be triggered only if a predetermined amount of pressure is exercised by the finger. When event a. is sensed, the processor 43 activates the mouse control unit 45. This control means that when a finger contacts anywhere the main control field 35, the mouse control unit 45 is activated and as a consequence the driver 34 is turned on and the cursor control is activated. This also means when there is no finger on the main control field 35, there is no cursor control and the cursor stays at the previously set position. In this function the use of a minimum threshold contact pressure can be preferred so hat the operation of the air mouse function can be turned on in response to a well distinguishable pressure.

If the finger is not moved but only touches anywhere the main control field 35, the cursor control signals of the motion sensor 33 are allowed to pass through the mouse control unit 45 and reach the control input of the driver 34, and these signals will control the cursor of the screen 32 of the host device 30, and the device 10 functions as a conventional air mouse, i.e. the cursor follows the hand movements.

When the event c. is sensed, i.e. when the finger is moved in parallel to the longitudinal axis 16, this is sensed by the processor 43 and it also determines the sense of the movement i.e. whether it is directed upward or downward. The processor 43 evaluates the direction and the speed of this longitudinal finger movement and also the distance of the momentary finger position from the initial positions, and generates a deflection control signal and this signal controls the deflection control unit 27 in such a way e.g. that a downward finger movement decreases the speed of the cursor deflection and an upward movement increases the same. The term "speed" of cursor movement is an expression that means that in response to a unity hand movement in any direction what distance the cursor will take. If the speed is high, then even slight hand movements result in speedy cursor movements, i.e. the cursor can be easily controlled to take greater distances on the screen. When the speed is low, then the same hand movement will result in only a much decreased cursor movement, and the user can easily manipulate around a smaller region on the screen to find a selected target. The cursor speed control provided in this way renders the handling of the air mouse much more comfortable, since the user can decide whether he wishes to move the cursor fast to a remote region on the screen or he wishes to target a smaller position in a small region.

Assuming that the user wishes to manipulate in a fairly small screen area or he can place his hand on a stable support and would prefer controlling the cursor by moving his finger along the main control field 35 as if it was a touch pad, i.e. he wishes to give up the air mouse function, then he has a possibility to do so. This can be done by selecting the event e. i.e. the user moves his finger also in transverse direction so that his movement has a component along the transverse arrow 41. This event will be sensed by the processor 43 and in response thereto the mouse control unit 45 gets a command to disconnect the motion sensor 33 from the driver 34. At the same time the processor 43 generates from the finger movement on the main control field 35 a touch pad control signal and transmits this signal through line 46 to the mouse control unit 45 and this passes these control signals to the driver 34. From this moment onwards the cursor will move as the finger moves on the main control field 35, and the hand movements (i.e. movement of the device 10) will not move the cursor. This "touch pad mode" will last as long as the user raises his finger from the main control field 35, and when he contacts this field again, the air mouse mode will be activated again. In between the cursor is frozen at the last position.

In case at any given position the user wishes to carry out a scroll function, he has to place his finger on the scroll field 36 which is sensed by the processor 43 and will control the cursor as the finger moves up or down along the scroll field 36.

In addition to these cursor control modes the conventional clicking function is also available. When the user compresses the device 10 slightly i.e. clicks, the displacement sensor 22 connected to the processor 43 is activated. This activation is interpreted as a left mouse button click if the finger is anywhere on the left field 37 and as a right mouse button click if the finger is anywhere on the right field 38. A central mouse button click is interpreted if the "clicking" occurs when the finger is on the scroll field 36. The distinction between these three possibilities is controlled by the control unit 45 upon control from the processor 43 so that a click selector 47 is set in one of the three positions, which positions control respective mouse inputs of the driver 34 that generates standard left-, right- and central mouse button click signals towards the transmitter 38. In order to provide a haptic feedback concerning the operation of the sensor 22 when the device 10 has been compressed, a small vibrator 76 (see FIG. 7) can be arranged in the body 11 of the device, and this vibrator 76 can be operated for a moment when the sensor 22 has sensed a compression. In this way the slight vibration indicates for the user that the clicking was successful.

In the described way the user has a freedom to control the movement of the cursor fast or in a slower way and to give up the air mouse mode and use his finger to make fine adjustments. Important to note that in neither one of the described modes is the placement of the device 10 on a stationary support required as in most of prior art designs, and the user is not bound to watch the screen of the air mouse, which need not exist at all. The device can be equipped with a screen if required for other functions that need a separate screen.

At the same time the device 10 fits comfortably in the hand of the user, and its handling by a finger is very comfortable and not at all tiring.

It should be understood that the blocks described illustrate only the main functional units of the device, and almost all blocks can be realized in a software route by an appropriately programmed micro controller. The invention is not limited to any of the embodiments or parts thereof.

Up to the present only the utilization of the first front part 13 of the device 10 has been described. The other second front part 14 has about the same useful surface area that can be utilized for a further function, namely for direct data entry. To this end the device 10 should be turned upside down to make the second front part become the upper surface and the first part contact the palm of the user. Since the device includes the motion sensor 33, this can sense which of the two parts 13 or 14 faces upwards, thus the change between the previously described mouse mode and the data entry mode can take place automatically, as the mode defined by the upper part will become active. While the automatic selection between the two possible functional modes is the easiest and most convenient when the function selection is automatically carried out when device 10 is turned upside down, the provision of a second functional mode with a second touch sensor surface can be realized even if the device 10 is turned by 180° so that the same face remains the upper face, but then the previously not used rear part will become the front part. In such a situation the design of the device should be slightly different, and the rear part need not become narrower in rearward direction as shown in FIG. 1.

Figure 5:
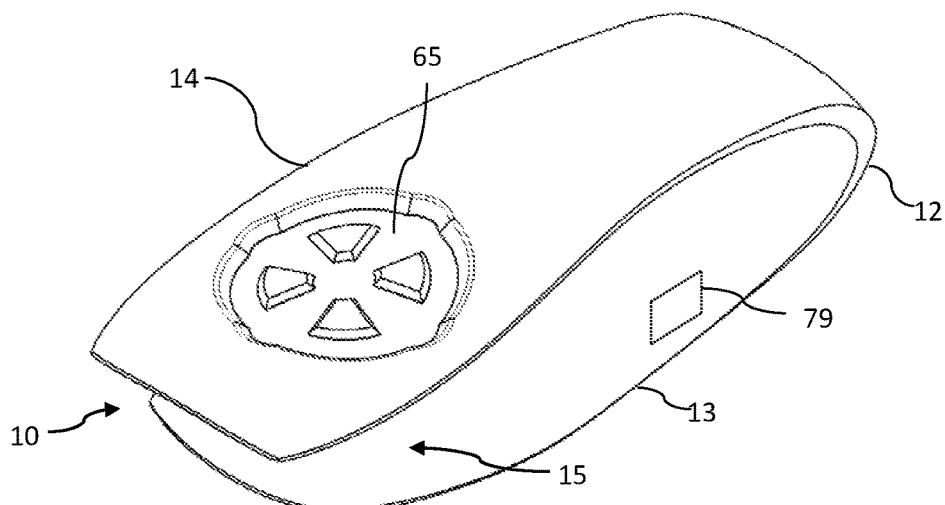
FIG. 5 is similar to FIG. 1 but here the second front part 14 faces upward.
Figure 6:
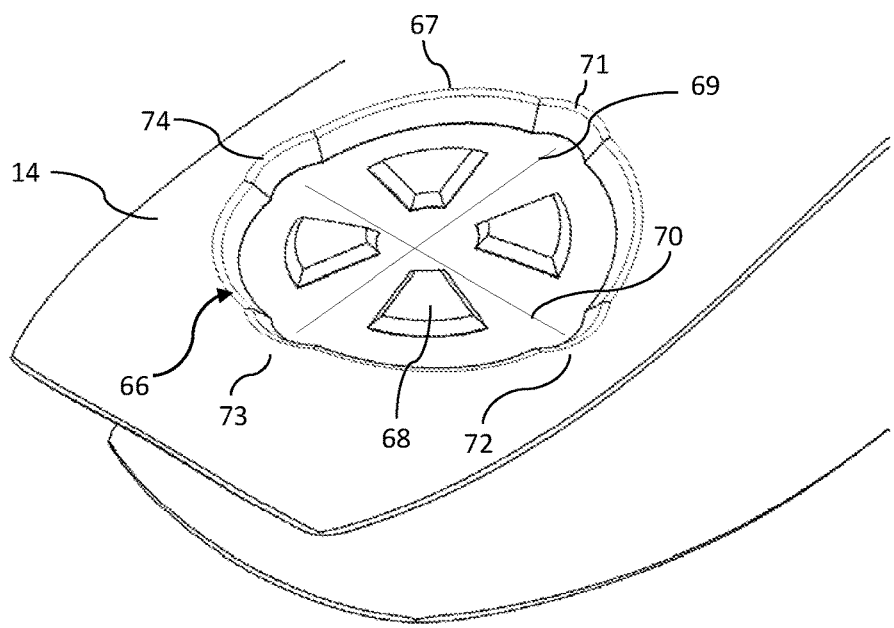
FIG. 6 shows an enlarged detail of FIG. 5.
Figure 7:
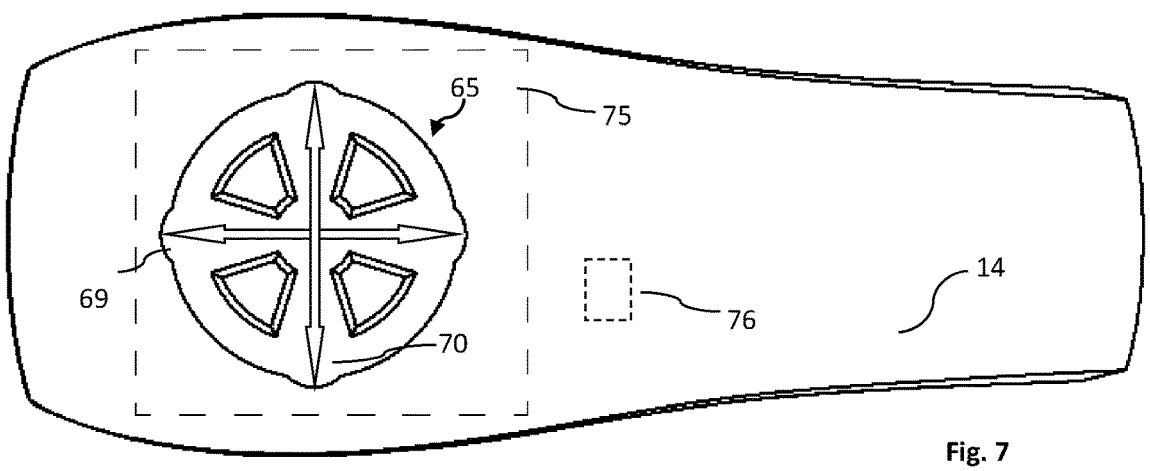
FIG. 7 shows the top view of the device shown in FIG. 5.

Reference is made now to FIGS. 5 to 7 in which an embodiment illustrating the second, direct data entry mode, in which there is no movable separate data entry element but the finger movements are sensed on a designated touch-sensitive region on the surface of this second front part 14. In FIG. 5 the other side of the hand held device 10 is shown. On the top of the upper front part 14, where the body has about the maximum width a special data entry region 65 is provided. FIG. 6 shows the enlarged perspective view of the upper front part 14 with the data entry region 65 thereon. The data entry region 65 has a central sunken area 66 encircled by a closed, preferably curved boundary 67. The depth of the sunken area 66 is small, but sufficient to enable feeling the boundary 67 by the finger placed on the area 66. A plurality of regularly arranged isles 68 are made in predetermined different positions of the recessed area 66 that stand out from the plane of the sunken area 66 and their height is somewhat below the level of the outer surface of the upper front part 14, but their projection is sufficient for the user to feel both their presence and orientation of channels formed between them when touching the area 66 by a finger that controls the data entry. In the illustrated embodiment four of such isles 68 are used, and each of them has a radially extending central symmetry axis. The central axes of opposite pairs of the isles lie on the same diagonal of the substantially circular boundary 67 which are mutually normal to each other, and they are inclined by 45° relative to the two main diagonals 69, 70 of the recessed area 66. The diagonal 69 extends in longitudinal direction of the device 10, and the diagonal 70 extends in transverse direction. At the same time the diagonals 69 70 define respective channels, and the finger placed on the data entry region 65 can sense these channels. The isles 68 are positioned in or close to the middle of the associated radius, and have arced inner and outer contours and straight sides as shown in FIG. 21. In a preferred embodiment the curved line of the boundary 67 of the sunken area is slightly broken at the ends of the diagonals 69, 70 (shown by the arrows on FIG. 7) forming four arced recesses 71, 72, 73 and 74.

FIG. 7 shows the top view of the upper front part 14 of the device 10 with the sunken data entry region 65. Under this region 65 in the interior of the body 11 of the device 10 a touch senor 75 is arranged, which is shown by dashed lines on FIG. 7 and it has a task similar to its task in touch screens to sense the location of the touch by the finger of the user. The area of the touch sensor 75 is preferably larger than the region 65 above it, so that there remains a sufficient surface area on the surface of the upper front part 14 which can be assigned to different functions when such areas or regions are touched.

When the user places one of his fingers (forefinger or thumb) on the region 65, he will feel the position and location of the four isles 68 and the channels formed between the isles and the rounded channel formed between the isles 68 and the boundary line 67, and he can thereafter move his finger in accordance with predetermined and previously learned association rules between the respective combinations of elementary movements and the data to be entered. The user can move his finger in any of the four directions along the diagonals 69, 70 in the channels formed between the isles 68. He can sense when his finger has reached the end of a channel, and for providing a more definite haptic feedback respective rounded recesses 71 to 74 can be arranged at these ends. The user can therefore sense when his finger has reached one of these special end regions or the recesses 71 to 74, and then he can choose in which direction he wishes to move on and feels not only the boundary 67 as a guiding path, but the finger senses the channel formed between the outer edges of the isles 68 and the boundary 67. This feeling is more definite as if he would feel only the edge of the boundary line 67, and the presence of the guiding channels assist the user in more definitely sensing where his finger moves. The movement continues along a channel portion until it arrives to the next one of the recesses. The haptic feedback (caused either by the meeting of two channels and/or the presence of a recess) provides a perfect orientation on the actual position of the finger. For further supporting the haptic feedback, in a further preferred embodiment, the small vibrator 76 can be activated when the finger arrives at one of these special channel end points where the recesses 71 to 74 are arranged. The vibration generated thereby can be very weak, it should be sufficient only for providing a further haptic signal to the user that the finger has arrived at a special position.

In this embodiment a predetermined associations can be assigned between the elementary movement combinations and the characters/functions to be entered which can be learned after an appropriate training period. The entry of a character/function is finished when the user raises his finger from the data entry region 65. The central linear channels between the isles 68 can be used additionally for triggering different functions. When the finger is inserted in the channels formed along the respective diagonals 69, 70 in the sunken area 66, it can be moved along the channels in both directions. As the touch sensor is sensitive to directions, by moving the finger along any one of the diagonals 69, 70 in any direction, four different functions can be assigned to such simple linear movements. Such functions can be e.g. the change between characters and numbers or letters in upper or lower case or any other usually used entry function.

In FIGS. 5 to 7 the data entry device 10 has been shown without having a screen or touch screen. The embodiment shown is intended primarily for use as a remote controller or to take the function of a remote keyboard for a palm top or a smart entertainment device, or the host device 30 with which it is connected via a wireless communication. Then text or data entered will be displayed on the screen of the remote device.

The previously described clicking function triggered by compressing the two separated parts 13, 14 of the device 10 works also in this data entry mode. This clicking can also control the vibrator 76 to generate a haptic feedback that the click has taken place. Such a design has great advantage, namely there is no special position on the device where the mouse function can be used, since the two parts 13, 14 can be compressed anywhere.

Figure 8:
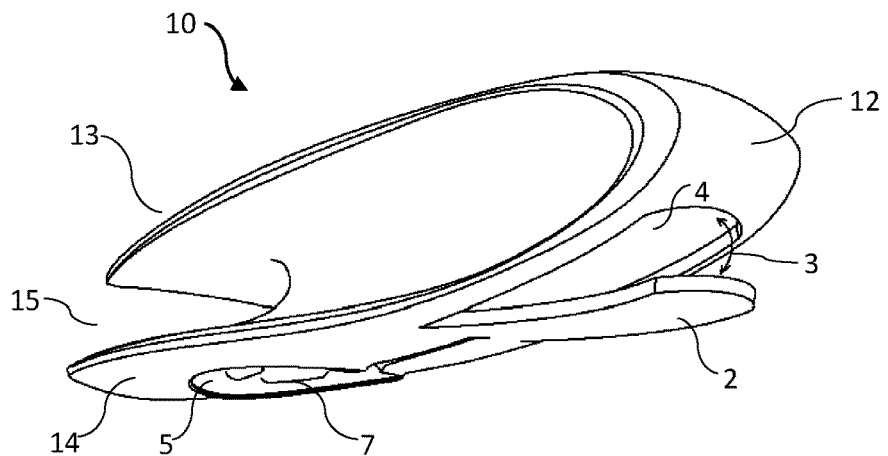
FIG. 8 shows the perspective view of am embodiment of the device tha is also equipped with an optical mouse.
Figure 9:
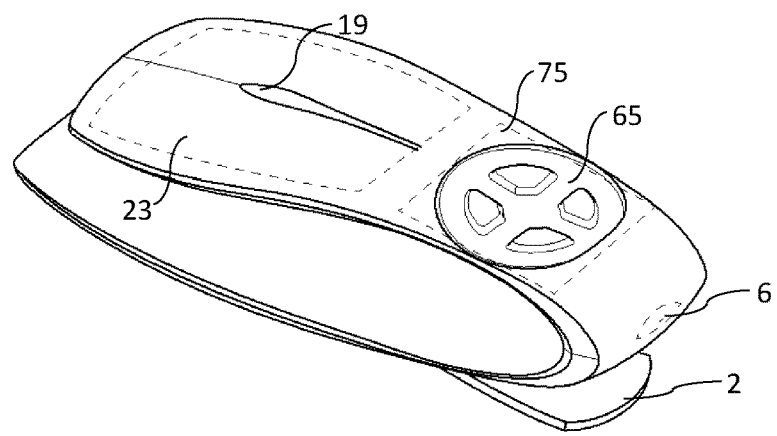
FIG. 9 is also a perspective view showing the other side of the device.
Figure 10:
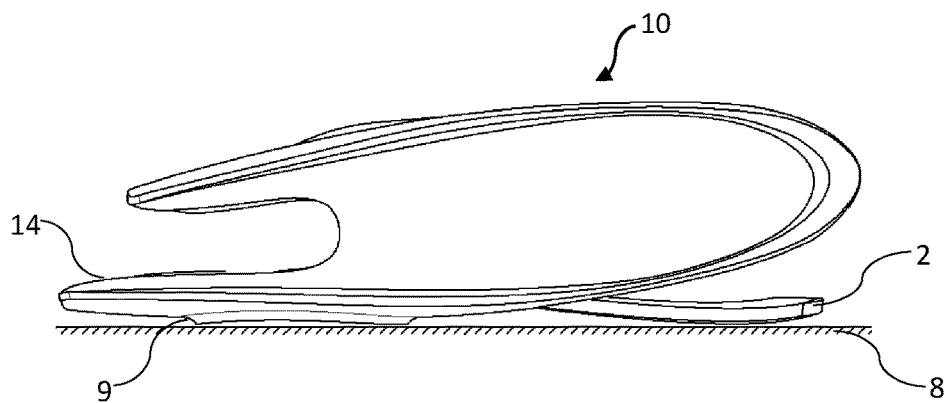
FIG. 10 is the side view of this embodiment.

Reference is made now to FIGS. 8 to 10 in which a further embodiment of the present invention has been shown. Up to the present two different main functions of the hand held device 10 has been shown, according to which it was used as an improved air mouse and as a data entry device. If one wishes to reduce the number of accessories that are normally required to the handling of modern computers or smart devices, then one cannot forget about the conventional mouse function. In this embodiment an example is shown how the previously described two main functions (or any of the two) can be combined with a conventional mouse, preferably an optical mouse.

This device 10' has substantially the same curved shape as shown in the previous embodiments, i.e. it has a slightly rounded shape that fits well in the palm of the user, and has the curved rear body part 12 and the first and second front parts 13, 14 defining the gap 15 between them. In this embodiment a slightly curved support plate 2 is provided at the lower region of the rear body part which has two stable positions, namely a closed position when its presence cannot be felt, i.e. its outer surface follows the outer surface of the rear body part 12 as shown e.g. in FIG. 3, and an open position as shown in FIGS. 8 to 10. The support plate 2 has a hidden hinge (not shown) that enables its opening and closing, but provides a sufficient resistance against closing. It can be preferred if a sunken lock 6 is provided that prevents closure of the support plate 2 until it is moved to an unlocked position when the plate can be returned to its original position i.e. in a recess 4.

At an appropriate region of the lower face of the second front part 14 a mouse window 5 is provided, through which the light of a conventional optical mouse circuit 7 can pass to "see" a stable surface of a mouse pad 8 placed on a table.

The hinged support plate 2 with its slightly convex outer surface is required, as the streamlined, curved basic shape of the device 10' cannot be supported or moved in a stable way of a plane surface of the mouse pad 8. In FIG. 10 it can be seen that the second front part 14 has a slightly inclined fringe 9 around the edge of the mouse window 5, and this fringe 9 and the spaced lower surface of the open support plate 2 provide a definite support for the device 10'.

The processor 43 can sense when the support plate 2 is put into open position and then disables the air mouse function and enables the conventional mouse function through the wireless connection between the device 10' and the remote host device.

In case the device 10' is also provided with the data entry function, then according to the intention of the user, this function can also be used.

In the embodiment using the conventional mouse function the previously described air mouse control function and the data entry function can both be provided so that the touch sensor 23 and optionally the recess 19 providing the scroll function can be at the front region of the first front part 13 as illustrated in FIG. 9 and the touch sensor 75 with the data entry region 65 can be arranged at the rear part of the same surface of the device 10'. In conventional mouse function mode the previously described clicking and scroll functions can be equally used, as then the touch sensor 23 is located at the area which can be conveniently handled by the finger of the user. If the data entry mode is chosen, the device 10' can be turned by 180° around a virtual vertical axis, and then the data entry touch sensor 75 will take the comfortable front position, and the rear body part 12 will be the front end.

The data entry device according to the invention can be realized in several forms, sizes other than shown in the exemplary embodiments and can be equipped with different electronic circuitry.

What is claimed:

1. A hand held electronic device (10) including an air mouse unit for communicating with a remote host device (30) having a display screen (32) on which a cursor is displayed, wherein during operation as an air mouse the component of the movement of the device in horizontal (yaw) and in vertical (pitch) direction controls the movement of the cursor in an associated direction, said device comprising an elongated body (11) having a first face fitting in the hand of a user that holds the device and a second opposite face which has at least a region for being touched, said region being configured, positioned and dimensioned to be easily accessible by a free finger of the hand of the user, wherein the second opposite face has a control field (35, 36) in said accessible region, and a touch sensor is arranged under the control field (35, 36) that senses when said control field (35, 36) is touched by the finger and when the finger is moved thereon, wherein the air mouse unit has a deflection control unit (27) controlling the speed of said cursor movement and a processor (43) is connected to said touch sensor that controls said deflection control unit (27) to increase or decrease said speed of the cursor control in response to a first finger movement on said control field (35, 36) and wherein the speed of said cursor control is increased or decreased depending on the distance of the finger position from an initial finger position when moved up or down during said first finger movement.

2. The device as claimed in claim 1, wherein said cursor movement is allowed or prohibited to function depending on whether said control field (35, 36) is touched or left untouched.

3. The device as claimed in claim 2, wherein said touch includes a contact with a pressure higher than a predetermined threshold value.

4. The device as claimed in claim 1, wherein said processor (43) is programmed to detect when a predetermined second finger movement is sensed different from said first movement, and in response to said detected second movement said air mouse function is terminated and the control of the cursor movement is taken over by the movement of the finger on said control field (35) as if was a touch pad.

5. The device as claimed in claim 1, wherein said body comprises a displacement sensor (22) generating a signal when said control field (35, 36) is pressed anywhere and a slight bending of said body (11) takes place, and said control field (35) is virtually divided into a left field (37) and a right field (38), and said signal generated by said displacement sensor (22) is associated with said left or right fields (37, 38), respectively to have said processor (23) generate a left mouse click signal or a right mouse click signal towards said remote host device (30) depending on whether said left or right field (37, 38) has been pressed.

6. The device as claimed in claim 5, wherein said control field has a separated narrow scroll field portion (36) extending substantially along the longitudinal direction of said body (11) and connected to said processor (23), and the touching and movement of this scroll field portion (36) by finger triggers said processor (23) to generate a scroll signal towards said remote host device (30) interpreted as scrolling the cursor up or down depending on the sense of finger movement on said scroll field (36).

7. The device as claimed in claim 6, wherein said processor (23) is programmed to sense when said scroll field (36) has been pressed and to generate then a central mouse click signal forwarded to said remote host device (30).

8. The device as claimed in claim 6, wherein said scroll field (36) is designed as a recess (19) on said second face to enable sensing when a finger is placed thereon.

9. The hand held electronic device (10) as claimed in any of claims 1 to 7, characterized by comprising a position sensor determining whether said device (10) is held with its first or second face fitting in the palm of the holding hand, or whether the device (10) has been turned by 180° around an imaginary vertical axis, and comprising a data entry device (60) with a data entry region (65) provided on one of said first or second faces on said body (11), and when the body (11) is positioned so that said data entry region (65) is the easily accessible one by the free finger, the operation as an air mouse is disabled and said data entry device (60) is enabled to switch over said device into a data entry mode, in which respective data are entered in said host device (30) and the data to be entered are associated with respective combinations of elementary finger movements along said data entry region (65).

10. The device as claimed in claim 9, wherein said data entry region (65) is a sunken area (66) lying deeper that said first surface and has a closed boundary (67), and a plurality of discrete isles (68) being provided that extend out from the sunken area (66); and said isles (68) are arranged so that respective channels being formed between them and between their outer edges and the closed boundary (67), wherein the channels between the isles (68) having their ends at respective special parts of said boundary (67), the channels are designed so that the moving finger can sense them and feel said special parts by haptic feedback only, and when said finger is moved along said channels of the data entry region (65) the user can sense by haptic feedback at what particular position the finger momentarily touches said entry region (65).

11. The device as claimed in claim 10, wherein said body (11) comprises a vibrator (76) vibrating slightly said body (11) when said touching finger touches one of said special parts of said boundary line (67) to provide an additional haptic feedback that the finger has arrived at a recess.

12. The device as claimed in claim 9, wherein respective recesses (71-74) being formed at said special parts of said boundary line (67) to provide a more definite haptic feedback when the finger has arrived at one of said special parts.

13. The device as claimed in any of claims 9 to 12, wherein said body (11) comprises a displacement sensor (22) sensing when a finger presses any of said faces towards the other one, and a touch sensor (75) is arranged under and extending over said data entry region (65), and depending on the position of the pressing finger at said extended region different signals being generated and forwarded to said remote host device (30) interpreted thereby as different function commands.

14. The device as claimed in claim 9 or 10, wherein said body (11) has an elongated, substantially flat rounded shape that fits in the holding hand and comprises smoothly adjoining three parts, a curved rear body part (12), a first extended front part (13) and a second extended front part (14) both having slightly rounded flat surfaces, the front parts (13 and 14) extend out in forward direction from the rear body part (12) and a gap (15) is defined between the first and second front parts (13, 14) closed by a rounded front side of the rear body part (12), and said data entry region (65) is located on the surface of said second front part (14).

15. A hand held electronic device (10) as claimed in any of claims 9 to 14, characterized in that a first touch sensor (23) is arranged at a first part of said faces of the body (11), said first touch sensor (23) when contacted by a free finger of a user at least partially controls said cursor movement, and said data entry device comprises a second touch sensor (75) arranged under a data entry region (65) which is located at a different second part of one of said faces, and said device can be turned in the hand so that said second touch sensor (75) becomes easily accessible by said free finger; and said device comprises additionally in said body (11) a conventional optical mouse circuit (7) and a window (5) at a third part of one of said faces different from said first and second parts, and the face of said body (11) which holds said window (5) has a shape that can be placed and smoothly moved on a plane support surface when used in optical mouse functional mode.

16. The device as claimed in claim 15, wherein said body (11) has a substantially flat rounded shape that fits in the holding hand and comprises smoothly adjoining three parts, a curved rear body part (12), a first extended front part (13) and a second extended front part (14) both having slightly rounded flat surfaces, the front parts (13 and 14) extend out in forward direction from the rear body part (12) and a gap (15) is defined between the first and second front parts (13, 14) closed by a rounded front side of the rear body part (12), and said first and second surface parts are arranged on a front and rear portion of the same first face of the body (11) and the window (5) is arranged at the opposite second face of the body (11), and comprises a support plate (2) pivotally attached to said rear body part (12) and can be turned to an open position in which the support plate (2) cooperates with a remote front part of said first face to provide a definite support for said smooth movement.

17. The device as claimed in claim 16, wherein said rear body part (12) comprises a lock (6) that fixes said support plate (6) in open position.

18. The device as claimed in claim 1, wherein subsequent cursor movement is set at said speed that was increased or decreased last touched by said finger.

19. A hand held electronic device (10) including an air mouse unit for communicating with a remote host device (30) having a display screen (32) on which a cursor is displayed, wherein during operation as an air mouse the component of the movement of the device in horizontal (yaw) and in vertical (pitch) direction controls the movement of the cursor in an associated direction, said device comprising an elongated body (11) having a first face fitting in the hand of a user that holds the device and a second opposite face which has at least a region for being touched, said region being configured, positioned and dimensioned to be easily accessible by a free finger of the hand of the user, wherein the second face has a control field (35, 36) in said accessible region, and a touch sensor is arranged under the control field (35, 36) that senses when said control field (35, 36) is touched by the finger and when the finger is moved thereon, wherein the air mouse unit has a deflection control unit (27) controlling the speed of said cursor movement in response to a first finger movement, wherein a processor (43) is connected to said touch sensor that controls said deflection control unit (27) to increase or decrease said speed of the cursor control in response to the first finger movement on said control field (35, 36).

\* \* \* \* \*